United States Patent
Sawyer

(10) Patent No.: US 12,147,392 B2
(45) Date of Patent: Nov. 19, 2024

(54) SYNCHRONIZNIG FILES HAVING FILENAMES WITH ILLEGAL CHARACTERS

(71) Applicant: Box, Inc., Redwood City, CA (US)

(72) Inventor: David Sawyer, Campbell, CA (US)

(73) Assignee: Box, Inc., Redwood City, CA (US)

(*) Notice: Subject to any disclaimer, the term of this patent is extended or adjusted under 35 U.S.C. 154(b) by 0 days.

(21) Appl. No.: 17/571,820

(22) Filed: Jan. 10, 2022

(65) Prior Publication Data
US 2023/0222103 A1  Jul. 13, 2023

(51) Int. Cl.
*G06F 16/178* (2019.01)
*G06F 16/16* (2019.01)

(52) U.S. Cl.
CPC .......... *G06F 16/178* (2019.01); *G06F 16/166* (2019.01)

(58) Field of Classification Search
CPC .............................. G06F 16/178; G06F 16/166
USPC ......................................................... 707/612
See application file for complete search history.

(56) References Cited

U.S. PATENT DOCUMENTS

| | | | | |
|---|---|---|---|---|
| 3,872,433 A * | 3/1975 | Holmes | .................. | G06V 30/12 382/175 |
| 3,878,331 A * | 4/1975 | Morgan | .................... | H04L 9/36 380/267 |
| 2004/0088153 A1 * | 5/2004 | Perrin | ..................... | G06F 16/10 703/26 |
| 2004/0177159 A1 * | 9/2004 | Butterfield | ............. | G06Q 10/10 709/206 |
| 2005/0165721 A1 * | 7/2005 | Inkinen | .................... | G06F 16/10 |
| 2005/0268317 A1 * | 12/2005 | Cormack | ............... | H04H 60/37 725/25 |
| 2006/0059212 A1 * | 3/2006 | Carro | .................... | G06F 16/955 707/E17.112 |
| 2008/0082558 A1 * | 4/2008 | Uno | ........................ | H04L 67/06 |
| 2009/0119342 A1 * | 5/2009 | Maniscalco | ............. | G06F 21/10 |
| 2010/0199144 A1 * | 8/2010 | Li | .......................... | H04L 1/0045 714/752 |
| 2011/0125768 A1 * | 5/2011 | Shibao | .................. | G06F 16/166 707/756 |
| 2011/0173228 A1 * | 7/2011 | Watanabe | ............... | G06F 16/29 707/769 |
| 2014/0201145 A1 * | 7/2014 | Dorman | .................. | G06F 16/27 707/634 |
| 2018/0012112 A1 * | 1/2018 | Suzuki | ................. | G06V 30/268 |

(Continued)

*Primary Examiner* — Cam Linh T Nguyen
(74) *Attorney, Agent, or Firm* — Sheridan Ross P.C.

(57) ABSTRACT

Embodiments are directed to synchronizing files between client devices utilizing different file systems with different filename restrictions. Generally speaking, a server of a cloud-based storage environment can, upon generation of a file or receiving a file from a first client device, detect any "illegal" characters therein, i.e., characters that are pre-defined by a file system of a second client device of the environment as being impermissible for use in a filename, and substitute a replacement character for those illegal characters. This replacement character can comprise a character that is permissible by the file system of both the first and second client devices, thereby allowing synchronization and access. Additionally, the server(s) can identify the original filename from the first client device and substitute the replacement characters back to the original filename when the file is being accessed by or synchronized with the first client device.

20 Claims, 5 Drawing Sheets

(56) References Cited

U.S. PATENT DOCUMENTS

2018/0300475 A1* 10/2018 Zhang ................ H04L 63/0272
2019/0132282 A1* 5/2019 Lei .......................... H04L 67/63

* cited by examiner

SYNCHRONIZNIG FILES HAVING FILENAMES WITH ILLEGAL CHARACTERS

FIELD OF THE DISCLOSURE

Embodiments of the present disclosure relate generally to methods and systems for synchronizing files in a cloud-based storage environment and more particularly to synchronizing files between client devices utilizing different file systems with different filename restrictions.

BACKGROUND

A cloud-based storage system can be used, for example, to provide remote storage of files and/or other content to a number of client devices or systems. In some cases, the cloud-based storage system can provide for synchronization of these files across multiple client devices, e.g., between a particular user's or group of users' computers and/or mobile devices. These client devices or systems can frequently execute different operating systems utilizing different file systems. For example, client devices may execute UNIX, Apple Mac OS, Microsoft Windows, etc. These different file systems have certain restrictions on the types and placement of characters that may be used in a filename and some of these file systems are more restrictive than the others in these requirements. For example, Apple File System (APFS) is very permissive regarding characters in filenames while Microsoft New Technology File System (NTFS) is more restrictive.

These different filename restrictions can create a problem in synchronizing storage systems when synchronizing filenames between client devices using different file systems. Specifically, a permissible filename on one client device may contain "illegal" or impermissible characters for a file system of another client device making that file inaccessible for that device. Previously, cloud-based storage systems would issue an alert or error message for such files, perhaps instructing a user to change the name of the file so that it could be synchronized with the other device having more restrictive file naming requirements. However, this approach can be tedious and even annoying for users, especially when large numbers of files are being synchronized. Hence, there is a need for improved methods and systems for synchronizing files between client devices utilizing different file systems with different filename restrictions.

BRIEF SUMMARY

Embodiments of the disclosure provide systems and methods for synchronizing files in a cloud-based storage environment. According to one embodiment, a method for synchronizing files in a cloud-based storage environment can comprise maintaining, by a first computing system of the cloud-based storage environment, a file to be synchronized between the first computing system and a second computing system of the cloud-based storage environment. The first computing system and the second computing system can utilize different file systems with different filename restrictions, and the file can have an original filename from the file system of the first computing system containing one or more illegal characters, the one or more illegal characters comprising characters that are predefined as being not permitted for use in a filename by the filename restrictions of the file system of the second computing system. The one or more illegal characters in the original filename for the file can be detected and a replacement character can be substituted for each of the one or more illegal characters in the original filename for the file. Substituting the replacement character for each of the one or more illegal characters in the original filename for the file can thereby create a first replacement name for the file. A two-way synchronization of the filename can then be performed between the first computing system and the second computing system based on the original filename of the file and the first replacement name of the file.

Performing the two-way synchronization of the filename between the first computing system and the second computing system can comprise providing the file with the first replacement name to the second computing system. An update of the file can be received from the second computing system. The update of the file can have a second replacement name comprising one or more replacement characters. A modified filename for the file can be determined based on the second replacement name for the update of the file from the second computing system.

Determining the modified filename for the file based on the second replacement name for the update of the file from the second computing system can comprise identifying the first replacement filename in the table of original filenames and replacement filenames based on a number and location of the one or more substitute characters in the second replacement name. For example, the first replacement name and the second replacement name may be the same. In such cases, identifying the original filename for the file based on the second replacement name can comprise finding an exact match of the location and number of the illegal character in the first replacement filename in the table and the location and number of the replacement character in the second replacement name. In another example, the first replacement name and the second replacement name may not be the same. In such cases, identifying the original filename for the file based on the second replacement name can comprise selecting the original filename for the file from the table of original filenames and replacement filenames based on a probability of a match between the corresponding first filename in the table and the second replacement name.

In response to determining the modified filename for the file, the update of the file can be synchronized with the first computing system using the determined modified file name. In response to failing to determine the modified filename for the file, the update to the file can be saved to the first computing system with the second replacement name. Additionally, or alternatively, in response to failing to determine the modified filename for the file, an error message can be provided.

According to another embodiment, a system can comprise a processor and a memory coupled with and readable by the processor. The memory can store therein a set of instructions which, when executed by the processor, causes the processor to synchronize files in a cloud-based storage environment by receiving from a first client device of the cloud-based storage environment, a file to be synchronized between the first client system and a second client system of the cloud-based storage environment. The first client system and the second client system can utilize different file systems with different filename restrictions, and the file can have an original filename from the file system of the first client containing one or more illegal characters, the one or more illegal characters comprising characters that are predefined as being not permitted for use in a filename by the filename restrictions of the file system of the second client device. The instructions can further cause the processor to detect the one or more illegal characters in the original filename for the file and substitute a replacement character for each of the one or more illegal characters in the original filename for the file. Substituting the replacement character for each of the one or more illegal characters in the original filename for the file can thereby create a first replacement name for the file. The instructions can further cause the processor to perform a two-way synchronization of the filename between the first client device and the second client device based on the original filename of the file and the first replacement name of the file.

Performing the two-way synchronization of the filename between the first computing system and the second computing system can comprise providing the file with the first replacement name to the second computing system. An update of the file can be received from the second computing system. The update of the file can have a second replacement name comprising one or more replacement characters. A modified filename for the file can be determined based on the second replacement name for the update of the file from the second computing system.

Determining the modified filename for the file based on the second replacement name for the update of the file from the second computing system can comprise identifying the first replacement filename in the table of original filenames and replacement filenames based on a number and location of the one or more substitute characters in the second replacement name. For example, the first replacement name and the second replacement name may be the same. In such cases, identifying the original filename for the file based on the second replacement name can comprise finding an exact match of the location and number of the illegal character in the first replacement filename in the table and the location and number of the replacement character in the second replacement name. In another example, the first replacement name and the second replacement name may not be the same. In such cases, identifying the original filename for the file based on the second replacement name can comprise selecting the original filename for the file from the table of original filenames and replacement filenames based on a probability of a match between the corresponding first filename in the table and the second replacement name.

In response to determining the modified filename for the file, the update of the file can be synchronized with the first computing system using the determined modified file name. In response to failing to determine the modified filename for the file, the update to the file can be saved to the first computing system with the second replacement name. Additionally, or alternatively, in response to failing to determine the modified filename for the file, an error message can be provided.

According to another embodiment, a non-transitory, computer-readable medium can comprise a set of instructions stored therein which, when executed by a processor, causes the processor to synchronize files in a cloud-based storage environment by receiving from a first client device of the cloud-based storage environment, a file to be synchronized between the first client system and a second client system of the cloud-based storage environment. The first client system and the second client system can utilize different file systems with different filename restrictions, and the file can have an original filename from the file system of the first client containing one or more illegal characters, the one or more illegal characters comprising characters that are predefined as being not permitted for use in a filename by the filename restrictions of the file system of the second client device. The instructions can further cause the processor to detect the one or more illegal characters in the original filename for the file and substitute a replacement character for each of the one or more illegal characters in the original filename for the file. Substituting the replacement character for each of the one or more illegal characters in the original filename for the file can thereby create a first replacement name for the file. The instructions can further cause the processor to perform a two-way synchronization of the filename between the first client device and the second client device based on the original filename of the file and the first replacement name of the file.

Performing the two-way synchronization of the filename between the first computing system and the second computing system can comprise providing the file with the first replacement name to the second computing system. An update of the file can be received from the second computing system. The update of the file can have a second replacement name comprising one or more replacement characters. A modified filename for the file can be determined based on the second replacement name for the update of the file from the second computing system.

Determining the modified filename for the file based on the second replacement name for the update of the file from the second computing system can comprise identifying the first replacement filename in the table of original filenames and replacement filenames based on a number and location of the one or more substitute characters in the second replacement name. For example, the first replacement name and the second replacement name may be the same. In such cases, identifying the original filename for the file based on the second replacement name can comprise finding an exact match of the location and number of the illegal character in the first replacement filename in the table and the location and number of the replacement character in the second replacement name. In another example, the first replacement name and the second replacement name may not be the same. In such cases, identifying the original filename for the file based on the second replacement name can comprise selecting the original filename for the file from the table of original filenames and replacement filenames based on a probability of a match between the corresponding first filename in the table and the second replacement name.

In response to determining the modified filename for the file, the update of the file can be synchronized with the first computing system using the determined modified file name. In response to failing to determine the modified filename for the file, the update to the file can be saved to the first computing system with the second replacement name. Additionally, or alternatively, in response to failing to determine the modified filename for the file, an error message can be provided.

Figure 1:
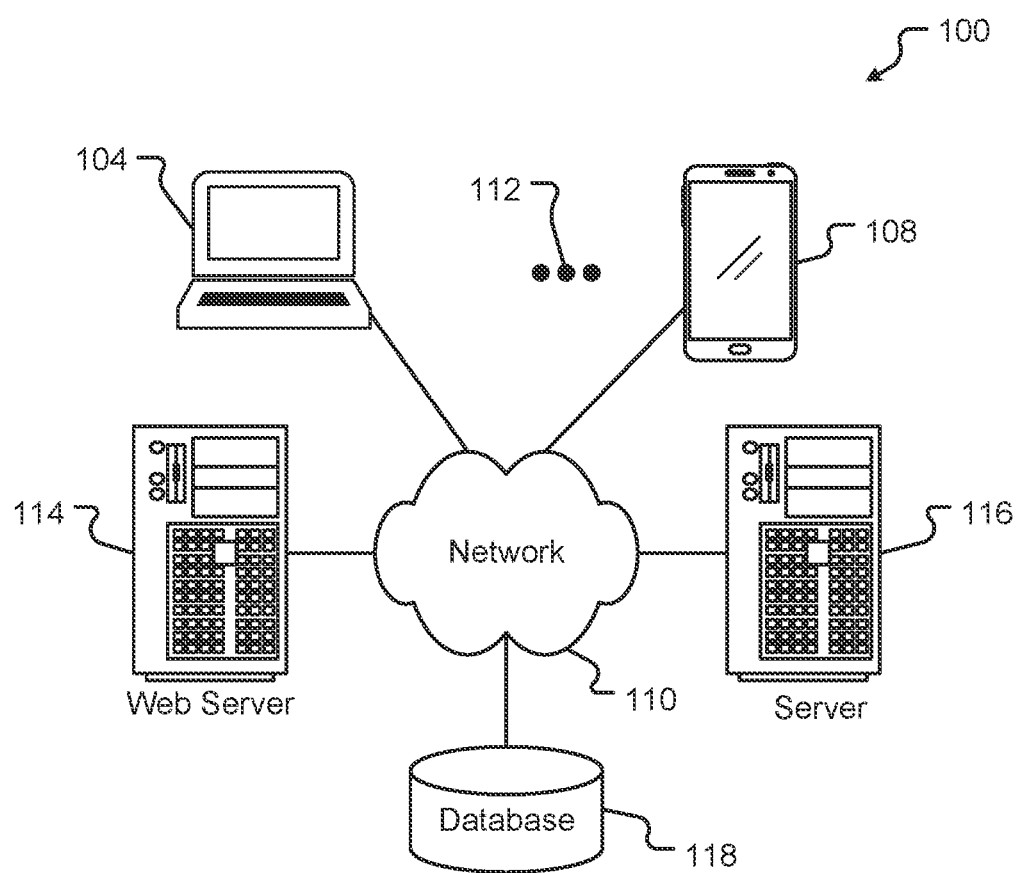
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
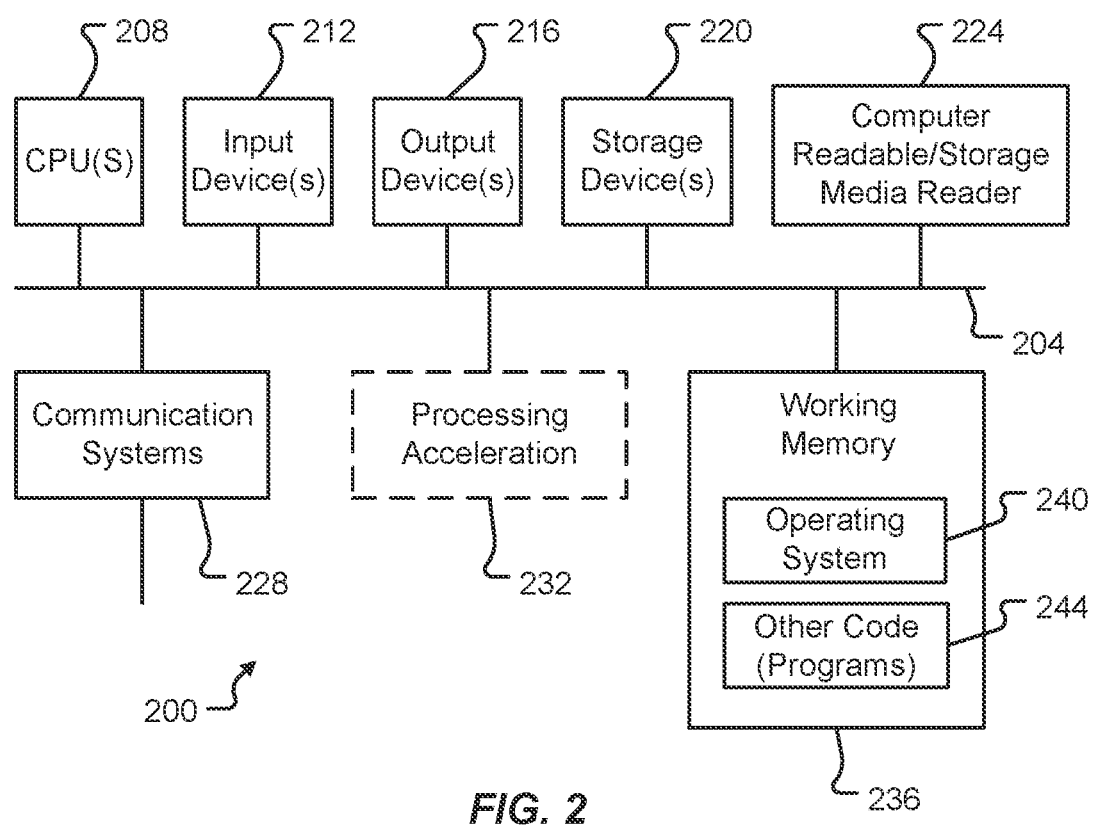
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
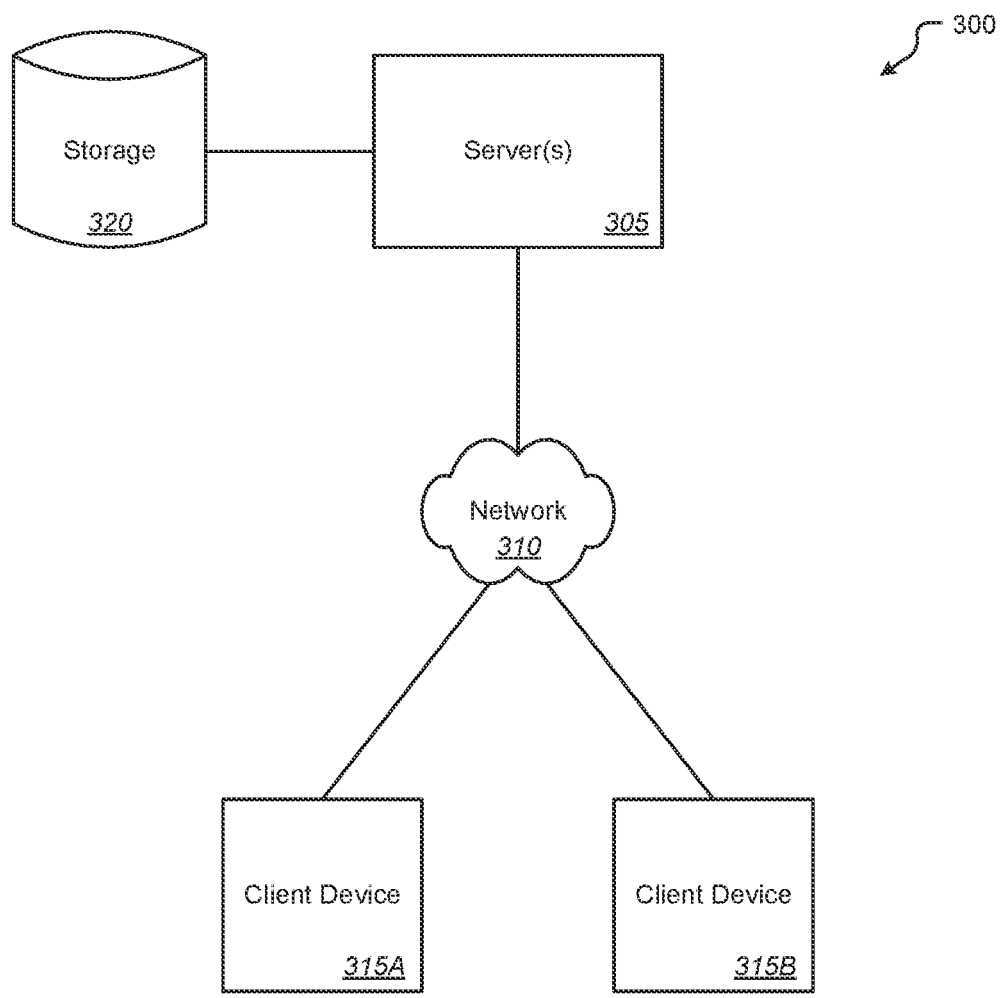
FIG. 3 is a block diagram illustrating a cloud-based storage environment in which various embodiments of the present disclosure may be implemented.

FIG. 3 is a block diagram illustrating a cloud-based storage environment in which various embodiments of the present disclosure may be implemented. As illustrated in this example, the cloud-based storage environment 300 can include one or more servers 305 such as any of the servers and/or other computing devices described above. The server(s) 305 can be communicatively coupled with one or more wired and/or wireless, local and/or wide-area networks 310 as also described above. Any number of client devices 315 can also be communicatively coupled with the communications network 310. The client devices 315 can comprise any desktop or laptop computer, smart phone, tablet, other mobile device, or any other computing device as described above.

Generally speaking, the server(s) 305 can provide a number of services to the client devices 315 over the network 310. These services can include remote storage services allowing the client devices 315 to upload files and/or other content to be stored and maintained by the server(s) 305 in databases or other storage 320. In some cases, the server(s) 305 can also provide for synchronization of these files across client devices 315. Additionally, or alternatively, the server(s) 305 can provide a collaboration environment in which files maintained in the storage 320 may be made accessible to the client devices 315 by the server(s) 305 through a collaboration environment in which one or more client devices 315 can upload, read, edit, download, etc. the file based on permissions granted to users of the client devices 315.

In some cases, different client devices 315A and 315B may execute different operating systems. Therefore, the different client devices 315A and 315B may have different file systems that are not completely compatible because, for example, the operating system of one client device 315B may have a file system that imposes certain restrictions on the characters used in a filename while another client device 315A does not impose those same restrictions. For a more specific example, a first client device 315A may execute an Apple MacOS or UNIX operating system, either of which allow filenames including characters that are not permitted in another operating system such as Windows which may be executed on a second client device 315B. As known in the art, Windows prohibits the use of the following characters in filenames: < (less than); > (greater than); :(colon); "(double quote); / (forward slash); \ (backslash); | (vertical bar or pipe); ? (question mark); * (asterisk). However, many of these characters are permissible in other file systems. If a file having a filename containing any of these characters is provided by the first client device 315A to the server(s) 305 for maintenance in storage 320, such a file would not be accessible by the second client device 315B and could not be effectively synchronized with the second client device 315B.

Accordingly, embodiments of the present disclosure are directed to synchronizing files between client devices utilizing different file systems with different filename restrictions. Generally speaking, the server(s) 305 can be adapted to, upon generation of a file or receiving a file from a first client device 315A, detect any "illegal" characters therein, i.e., characters that are predefined by a file system of a second client device 315B which may access that file as being impermissible for use in a filename, and substitute a replacement character for those illegal characters. This replacement character can comprise a character that is permissible by the file system of the second client device 315B, as well as the first client device 315A, thereby allowing synchronization and access. Additionally, the server(s) 305 can be adapted to identify the original filename from the first client device 315A and substitute the replacement characters back to the original filename when the file is being accessed by or synchronized with the first client device 315A.

For example, the replacement character can comprise □, i.e., white box, or Unicode U+25A1. Unicode documentation recommends this character for quadrature, the alchemical symbol for salt, used in astrological contexts for aspect square, and it may be used to represent a missing ideograph. This character, or another suitable character, can be used to replace any occurrence of a character in a filename that may be illegal or impermissible in any client device which may access or synchronize with the file. Renamed files and/or folders can be viewed, edited, moved, and deleted exactly the same as any other files.

Stated another way, synchronizing files in a cloud-based storage environment 300 can comprise maintaining, by a server 305 of the cloud-based storage environment 300, a file to be synchronized between the first client system 315A and a second client system 315B of the cloud-based storage environment 300. The first client system 315A and the second client system 315B can utilize different file systems with different filename restrictions, and the file can have an original filename from the file system of the first client 315A containing one or more illegal characters. The one or more illegal characters can comprise characters that are predefined as being not permitted for use in a filename by the filename restrictions of the file system of the second client device 315B. For example, the first client deice 315A can be an Apple or Unix system which are relatively permissive of which characters are allowed to be used in filenames while the second client device 315B can be a Windows system which is more restrictive of characters allowed in filenames as noted above.

The one or more illegal characters in the original filename for the file can be detected and a replacement character can be substituted for each of the one or more illegal characters in the original filename for the file. For example, a "□" symbol, i.e., Unicode U+25A1, can be substituted for a "<" symbol, ">" symbol, or other non-permitted symbol on the file system of client device 315B. The Unicode U+25A1 character is defined as "may be used to indicate a missing symbol." It is also recommended in TrueType and OpenType to represent a character that cannot be rendered. By using a symbol that represents illegal characters no legal characters are excluded from display to the user. This may be preferred over the replacement char (U+FFFD REPLACEMENT CHARACTER, ◆ ), which is used to signal errors in invalid Unicode streams which is usually rendered as a question mark inside a diamond. This is different from the box that's shown for valid Unicode characters that cannot be rendered by the selected font. That is called the .notdef glyph. Substituting the replacement character for each of the one or more illegal characters in the original filename for the file can thereby create a first replacement name for the file. A two-way synchronization of the file can then be performed between the first client device and the second client device based on the original filename of the file and the first replacement name of the file. Generally speaking, this two-way synchronization process will allow the file to appear on the file system of the second client device 315B using the replacement filename having the replacement characters in place of the illegal or impermissible characters of the original filename. It will also allow synchronization of this file back to the first client device when changes are made by the second client device 315B. Additional details of an exemplary synchronization process are described below with reference to FIG. 4.

According to one embodiment, this two-way synchronization can include substituting the replacement characters back to those of the original filename when making a change or update back to the originating system or device. For example, this "un-replace" substitution can be performed based on a comparison of the replacement name containing the replacement characters to the original filename. If there is an exact one-to-one match between the number and location of the replacement characters in the replacement name for a file and the number and location of illegal characters in one of the original filenames, that is, both the original name and the new, replacement name have the same number of replacement characters and illegal characters, the original filename illegal characters can be used for synchronization back the that originating client device. When the number and/or location of replacement characters and illegal characters differs, a probability determination can be made in an attempt to identify the original file name. Examples of such determination will be described below.

Stated another way, performing the two-way synchronization of the file between the first client 315A and the second client 315B can comprise maintaining the original filename in a table of original filenames and replacement filenames and providing, or allowing access to, the file with the first replacement name to the second client device 315B. An update of the file can be received from the second client device 315B. The update can be a result of a change to the file. This can be a change to a non-name related aspect, such as content, containing folder, owner, modification date, visibility, permissions, sharing status, lock state, icon, preview, etc., or even the name of the file. The update of the file can have a second replacement name comprising one or more replacement characters. While referred to here as a second replacement name to distinguish it from the first replacement name provided by the server 305 to the second client device 315B with the file, the second replacement name may, in fact, match the first replacement file name, such as when the content of the file has been changed but the name of the file has not. In other cases, such as when the name of the file has been changed on the second client system 315B, the second replacement name may be different, to some extent, from the first replacement name. In such cases, the modified filename for the file can be determined based on the second replacement name for the update of the file received from the second client device 315B.

More specifically, determining the modified filename for the file based on the second replacement name for the update of the file from the second client device 315B can comprise identifying the first replacement filename in the table of original filenames and replacement filenames based on a number and location of the one or more substitute characters in the second replacement name. For example, and as noted above, the first replacement name and the second replacement name may be the same. In such cases, determining the modified filename for the file based on the second replacement name can comprise finding an exact match of the location and number of the illegal character in the table of original filenames and replacement names and the location and number of the replacement character in the second replacement name. In another example, the first replacement name and the second replacement name may not be the same. In such cases, determining the modified filename for the file based on the second replacement name can comprise determining the modified filename for the file based on a probability of a match between a first replacement name from the table and the second replacement name.

A determination can be made as to whether the modified filename has been successfully determined. In response to determining the modified filename for the file has been successfully determined, the update of the file can be synchronized with the first client device using the determined modified file name, i.e., the new, changed name. In response to determining the modified filename for the file was not successfully determined, i.e., determining the modified filename for the file failed, the update to the file can be provided to the first client with the second replacement name. Additionally, or alternatively, in response to determining the modified filename for the file was not successfully determined, an error message can be provided to the second client device indicating the unidentified name. Additional details of an exemplary two-way synchronization process will be described below with reference to FIG. 5.

According to another embodiment, rather than maintaining both original filenames and corresponding replacement filenames in the table, only the original filename may be maintained. Again, this name may contain characters that are illegal on one or more of the systems. However, and is such cases, the replacements described above can be done "on-the-fly" or as needed when that name is used to synchronize with the system on this some of the characters are illegal. So, for example, a filename like "hello!" may be used and can be saved in the table. In one system, the quote marks may be defined as illegal characters but the exclamation point may be legal. When synchronizing with that system, the substitution can be done and the replacement name ☐hello!☐ can be generated and used. Another system may define the exclamation point as illegal but the quotes are legal. When synchronizing with that system, the substitution can be done and the replacement name "hello☐" can be generated and used.

It should be noted that the example above in which the server 305 performs the synchronization is provided for illustrative purposes and is not intended to limit the scope of the present disclosure. In other embodiments, synchronization may be performed peer-to-peer, i.e., between the client devices 315A and 315B. More specifically, synchronizing files in a cloud-based storage environment 300 can comprise maintaining, by a first computing system 315A of the cloud-based storage environment, a file to be synchronized between the first computing system 315A and a second computing system 315B of the cloud-based storage environment. The first computing system 315A and the second computing system 315B can utilize different file systems with different filename restrictions, and the file can have an original filename from the file system of the first computing system 315A containing one or more illegal characters, the one or more illegal characters comprising characters that are predefined as being not permitted for use in a filename by the filename restrictions of the file system of the second computing system 315B. The one or more illegal characters in the original filename for the file can be detected and a replacement character can be substituted for each of the one or more illegal characters in the original filename for the file. Substituting the replacement character for each of the one or more illegal characters in the original filename for the file can thereby create a first replacement name for the file. A two-way synchronization of the file can then be performed between the first computing system and the second computing system based on the original filename of the file and the first replacement name of the file.

Performing the two-way synchronization of the file between the first computing system 315A and the second computing system 315B can comprise providing the file with the first replacement name to the second computing system 315B. An update of the file can be received from the second computing system 315B. The update of the file can have a second replacement name comprising one or more replacement characters. A modified filename for the file can be determined based on the second replacement name for the update of the file from the second computing system 315B in the same way as described above and in FIG. 5 described below.

For illustrative purposes only, some examples of such character replacement will no be described. As a first example, a file with an original filename of He asked: "What?" can be have the illegal characters of :, ", and ? substituted with the replacement character of ☐ thereby generating the replacement filename He asked☐☐What☐☐. Similarly, the original filename Case 1234: Gollum/Sméagol v. Shire can result in the replacement filename Case 1234☐Gollum☐Sméagol v. Shire.

In some cases, the replacement filename may be changed. In such cases, the original filename may still be identified in some cases. For example, the replacement filename He asked☐☐What☐☐ might be changed to He said☐☐Huh☐☐. While a comparison to the original filename from above does not produce an exact match of the string, there is still a direct, one-to-one match of the number and location of the replacement characters in the replacement filename and the original filename. Therefore, it could be assumed that the replacement filename was changed and the file with the original filename He asked:"What?" could be updated accordingly. For example, the original file can be renamed He said:"Huh?" Similarly, when the illegal characters in original filename 12:00 are replaced, the resulting replacement name is 12☐00. If this replacement filename is changed to 12☐30, it can still be matched to the original filename 12:00 assuming there is not another file with original filename 12:30 already.

In a more difficult example, one or more of the replacement characters in the replacement filename might be changed. For example, original filename dunked ??? results in the replacement name dunked☐☐☐ which might be changed to dunked☐. In this case, there is no direct match between the original filename and the replacement filename. However, and especially since the illegal characters are all the same, it can be assumed that they were truncated. In this case, the original file can be updated, including updating the filename to dunked?.

This would not be possible if the illegal characters were different, such as dunked<?> since it would be impossible to determine which illegal characters should be deleted. For example, the original filename He asked: "What?" results in the replacement filename He asked☐☐What☐☐ which can be changed to ☐What☐. In this case, it is equally probably, and thus impossible to tell, which of the last two characters changes. The change can be either "What? Or "What" with equal probability.

Other changes to the replacement filename will also result in an inability to correctly identify and update the original filename.

For example, the original filename "12:00" results in the replacement filename ☐12☐00☐. If this is changed to ☐12☐30☐00☐, it is not possible to determine what the added characters might be. The change may be any of "12:30:00" or "12:30"00" or "12"30:00" or "12☐30:00" or "12:30☐00"☐ or many more. In cases where the change cannot be determined, the server(s) 305 can issue an alert or error message. Additionally, or alternatively, they can synchronize the file with the replacement name by adding it to the originating, i.e., the first as described above, client device 315A.

Figure 4:
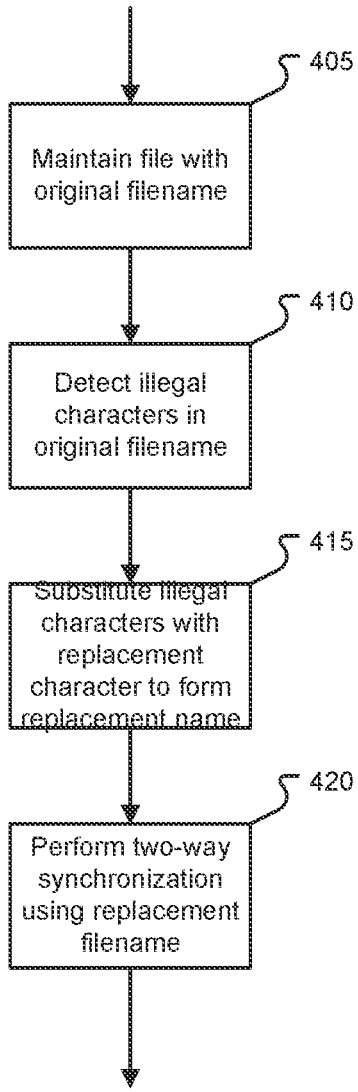
FIG. 4 is a flowchart illustrating an exemplary process for synchronizing files in a cloud-based storage environment according to one embodiment of the present disclosure.

FIG. 4 is a flowchart illustrating an exemplary process for synchronizing files in a cloud-based storage environment according to one embodiment of the present disclosure. As illustrated in this example, synchronizing files in a cloud-based storage environment 300 can comprise maintaining 405, by a server 305 of the cloud-based storage environment 300 a file to be synchronized between the first client system 315A and a second client system 315B of the cloud-based storage environment 300. The first client system 315A and the second client system 315B can utilize different file systems with different filename restrictions, and the file can have an original filename from the file system of the first client 315A containing one or more illegal characters. The one or more illegal characters can comprise characters that are predefined as being not permitted for use in a filename by the filename restrictions of the file system of the second client device 315B. For example, the first client deice 315A can be an Apple or Unix system which are relatively permissive of which characters are allowed to be used in filenames while the second client device 315B can be a Windows system which is more restrictive of characters allowed in filenames as noted above.

The one or more illegal characters in the original filename for the file can be detected 410 and a replacement character can be substituted 415 for each of the one or more illegal characters in the original filename for the file. For example, a "□" symbol, i.e., Unicode U+25A1, can be substituted for a "<" symbol, ">" symbol, or other non-permitted symbol on the file system of client device 315B. Substituting 415 the replacement character for each of the one or more illegal characters in the original filename for the file can thereby create a first replacement name for the file. A two-way synchronization of the file can then be performed 420 between the first client device and the second client device based on the original filename of the file and the first replacement name of the file. Generally speaking, this two-way synchronization process will allow the file to appear on the file system of the second client device 315B using the replacement filename having the replacement characters in place of the illegal or impermissible characters of the original filename. It will also allow synchronization of this file back to the first client device when changes are made by the second client device 315B. Additional details of an exemplary two-way synchronization process will be described below with reference to FIG. 5.

Figure 5:
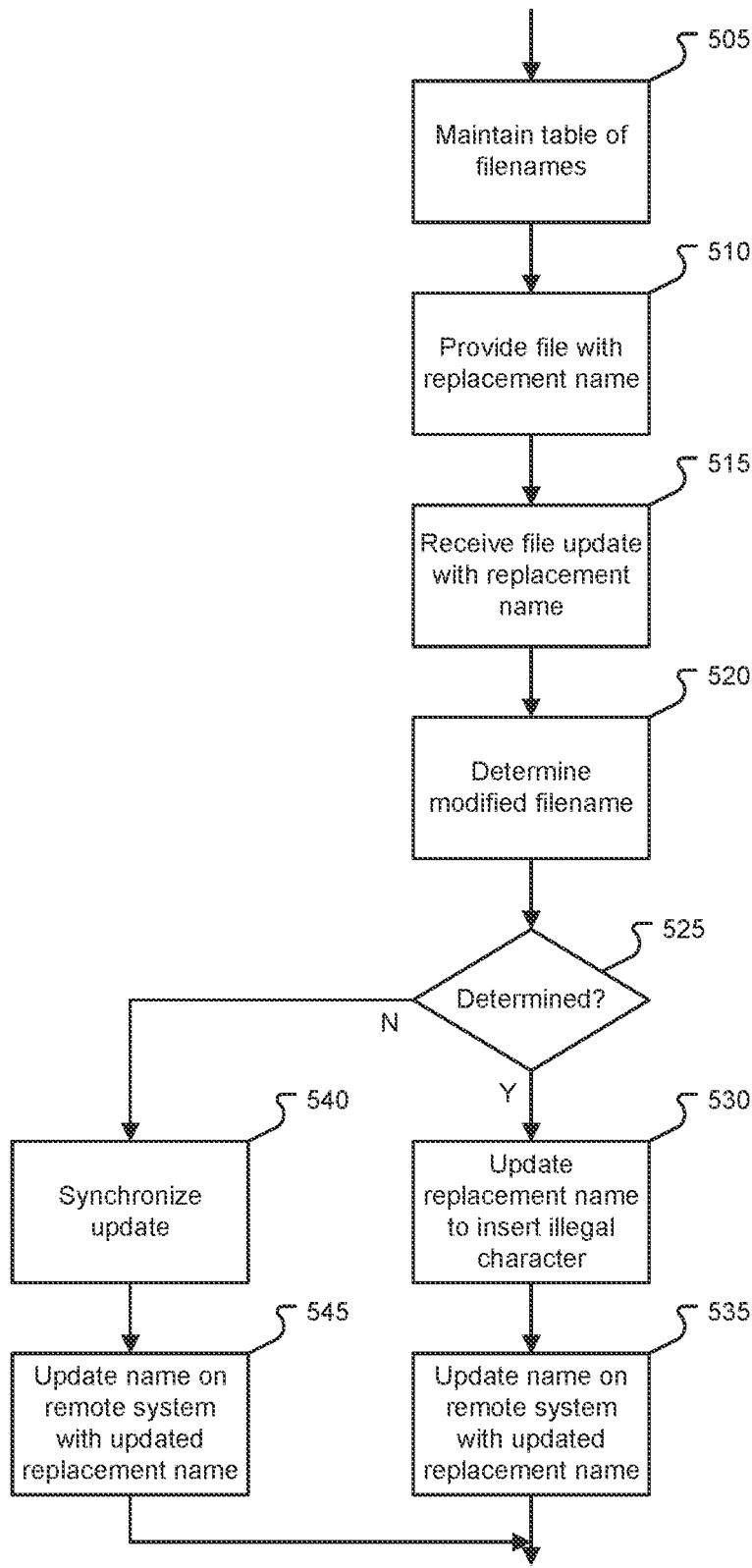
FIG. 5 is a flowchart illustrating additional details of performing a two-way synchronization in a cloud-based storage environment according to one embodiment of the present disclosure.

FIG. 5 is a flowchart illustrating additional details of performing a two-way synchronization in a cloud-based storage environment according to one embodiment of the present disclosure. As illustrated in this example, performing the two-way synchronization of the file between the first client 315A and the second client 315B can comprise maintaining 505 the original filename in a table of original filenames and replacement filenames and providing 510, or allowing access to, the file with the first replacement name to the second client device 315B. An update of the file can be received 515 from the second client device 315B. The update can be a result of a change to the file. This can be a change to a non-name related aspect, such as content, containing folder, owner, modification date, visibility, permissions, sharing status, lock state, icon, preview, etc., or even the name of the file. The update of the file can have a second replacement name comprising one or more replacement characters. While referred to here as a second replacement name to distinguish it from the first replacement name provided by the server 305 to the second client device 315B with the file, the second replacement name may, in fact, match the first replacement file name, such as when the content of the file has been changed but the name of the file has not. In other cases, such as when the name of the file has been changed on the second client system 315B, the second replacement name may be different, to some extent, from the first replacement name. In such cases, a modified filename for the file can be determined 520 based on the second replacement name for the update of the file received from the second client device 315B.

More specifically, determining 520 the modified filename for the file based on the second replacement name for the update of the file from the second client device 315B can comprise looking up the second replacement filename in the table of original filenames and replacement filenames based on a number and location of the one or more substitute characters in the second replacement name. For example, and as noted above, the first replacement name and the second replacement name may be the same. In such cases, determining 520 the modified filename for the file based on the second replacement name can comprise finding an exact match for the second replacement name in the table of original filenames and replacement filenames. In another example, the first replacement name and the second replacement name may not be the same. In such cases, determining 520 the modified filename for the file based on the second replacement name can comprise determining the modified filename based on a probability of a match between the table the second replacement name.

A determination 525 can be made as to whether modified filename has been successfully determined 520. In response to determining 525 the modified filename for the file has been successfully determined 520, the second replacement name can, in some cases, be updated 530 by inserting an identified illegal character and the filename on the first client can be updated 535 with the updated second replacement name. In response to determining 525 the modified filename for the file was not successfully determined 520, the file can be saved 540 to the first client device using the second replacement filename and an error message can be provided 545 to the second client device indicating the unidentified name.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for synchronizing files in a cloud-based storage environment, the method comprising:

maintaining, by a first computing system of the cloud-based storage environment, a file to be synchronized between the first computing system and a second computing system of the cloud-based storage environment, wherein the first computing system and the second computing system utilize different file systems with different filename restrictions, and wherein the file has an original filename from the file system of the first computing system containing one or more illegal characters, the one or more illegal characters comprising characters that are predefined as being not permitted for use in a filename by the filename restrictions of the file system of the second computing system;

detecting, by the first computing system of the cloud-based storage environment, the one or more illegal characters in the original filename for the file;

creating, by the first computing system, a first replacement name for the file by substituting a replacement character for each of the one or more illegal characters in the original filename for the file; and performing, by the first computing system of the cloud-based storage environment, a two-way synchronization of the file between the first computing system and the second computing system based on a direct comparison between the original filename of the file and the first replacement name of the file and without an intermediate mapping between the original filename of the file and the first replacement name of the file.

2. The method of claim 1, wherein performing the two-way synchronization of the file between the first computing system and the second computing system comprises:

maintaining the original filename in a table of original filenames and replacement filenames; and providing the file with the first replacement name to the second computing system.

3. The method of claim 2, wherein performing the two-way synchronization of the file between the first computing system and the second computing system further comprises:

receiving, by the first computing system of the cloud-based storage environment, an update of the file from the second computing system, the update of the file having a second replacement name comprising one or more replacement characters;

determining, by the first computing system of the cloud-based storage environment, a modified filename for the file based on the second replacement name for the update of the file from the second computing system; and in response to determining the modified filename for the file, synchronizing, by the first computing system of the cloud-based storage environment, the update of the file with the first computing system using the determined modified file name.

4. The method of claim 3, wherein determining the modified filename for the file based on the second replacement name for the update of the file from the second computing system comprises determining the modified filename based on the table of original filenames and replacement filenames.

5. The method of claim 4, wherein the first replacement name and the second replacement name are the same and wherein determining the modified filename for the file comprises finding an exact match of the location and number of the illegal character in the table of original filenames and replacement filenames and the location and number of the replacement character in the second replacement name.

6. The method of claim 4, wherein the first replacement name and the second replacement name are not the same and wherein determining the modified filename for the file based on the second replacement name further comprises determining the modified filename for the file based on filenames in the table of original filenames and replacement filenames and a probability of a match with the second replacement name.

7. The method of claim 3, wherein performing the two-way synchronization of the file between the first computing system and the second computing system further comprises, in response to failing to determine the modified filename for the file, storing, by the first computing system of the cloud-based storage environment, the file with the second replacement name.

8. The method of claim 3, wherein performing the two-way synchronization of the file between the first computing system and the second computing system further comprises, in response to failing to determine the modified filename for the file, providing, by the first computing system of the cloud-based storage environment, an error message.

9. A system comprising:

a processor; and a memory coupled with and readable by the processor and storing therein a set of instructions which, when executed by the processor, causes the processor to synchronize files in a cloud-based storage environment by:

receiving from a first client device of the cloud-based storage environment, a file to be synchronized between the first client system and a second client system of the cloud-based storage environment, wherein the first client system and the second client system utilize different file systems with different filename restrictions, and wherein the file has an original filename from the file system of the first client containing one or more illegal characters, the one or more illegal characters comprising characters that are predefined as being not permitted for use in a filename by the filename restrictions of the file system of the second client device;

detecting the one or more illegal characters in the original filename for the file;

creating a first replacement name for the file by substituting a replacement character for each of the one or more illegal characters in the original filename for the file; and performing a two-way synchronization of the file between the first client device and the second client device based on a direct comparison between the original filename of the file and the first replacement name of the file and without an intermediate mapping between the original filename of the file and the first replacement name of the file.

10. The system of claim 9, wherein performing the two-way synchronization of the file between the first client and the second client comprises:

maintaining the original filename in a table of original filenames and replacement filenames;

providing the file with the first replacement name to the second client device receiving an update of the file from the second client device, the update of the file having a second replacement name comprising one or more replacement characters;

determining a modified filename for the file based on the second replacement name for the update of the file from the second computing system, wherein determining the modified filename for the file based on the second replacement name for the update of the file from the second computing system comprises determining the modified filename based on the table of original filenames and replacement filenames; and in response to determining the modified filename for the file, synchronizing the update of the file with the first client device using the determined modified file name.

11. The system of claim 10, wherein the first replacement name and the second replacement name are the same and wherein determining the modified filename for the file comprises finding an exact match of the location and number of the illegal character in the table of original filenames and replacement filenames and the location and number of the replacement character in the second replacement name.

12. The system of claim 10, wherein the first replacement name and the second replacement name are not the same and wherein determining the modified filename for the file based on the second replacement name further comprises determining the modified filename for the file based on filenames in the table of original filenames and replacement filenames and a probability of a match with the second replacement name.

13. The system of claim 10, wherein performing the two-way synchronization of the file between the first computing system and the second computing system further comprises, in response to failing to determine the modified filename for the file, storing, by the first computing system of the cloud-based storage environment, the file with the second replacement name.

14. The system of claim 10, wherein performing the two-way synchronization of the file between the first computing system and the second computing system further comprises, in response to failing to determine the modified filename for the file, providing, by the first computing system of the cloud-based storage environment, an error message.

15. A non-transitory, computer-readable medium comprising a set of instructions stored therein which, when executed by a processor, causes the processor to synchronize files in a cloud-based storage environment by:

receiving from a first client device of the cloud-based storage environment, a file to be synchronized between the first client system and a second client system of the cloud-based storage environment, wherein the first client system and the second client system utilize different file systems with different filename restrictions, and wherein the file has an original filename from the file system of the first client containing one or more illegal characters, the one or more illegal characters comprising characters that are predefined as being not permitted for use in a filename by the filename restrictions of the file system of the second client device;

detecting the one or more illegal characters in the original filename for the file;

creating a first replacement name for the file by substituting a replacement character for each of the one or more illegal characters in the original filename for the file; and performing a two-way synchronization of the file between the first client device and the second client device based on a direct comparison between the original filename of the file and the first replacement name of the file and without an intermediate mapping between the original filename of the file and the first replacement name of the file.

16. The non-transitory, computer-readable medium of claim 15, wherein performing the two-way synchronization of the file between the first client and the second client comprises:

maintaining the original filename in a table of original filenames and replacement filenames;

providing the file with the first replacement name to the second client device receiving an update of the file from the second client device, the update of the file having a second replacement name comprising one or more replacement characters;

determining a modified filename for the file based on the second replacement name for the update of the file from the second computing system, wherein determining the modified filename for the file based on the second replacement name for the update of the file from the second computing system comprises determining the modified filename based on the table of original filenames and replacement filenames; and in response to determining the modified filename for the file, synchronizing the update of the file with the first client device using the determined modified file name.

17. The non-transitory, computer-readable medium of claim 16, wherein the first replacement name and the second replacement name are the same and wherein determining the modified filename for the file comprises finding an exact match of the location and number of the illegal character in the table of original filenames and replacement filenames and the location and number of the replacement character in the second replacement name.

18. The non-transitory, computer-readable medium of claim 16, wherein the first replacement name and the second replacement name are not the same and wherein determining the modified filename for the file based on the second replacement name further comprises determining the modified filename for the file based on filenames in the table of original filenames and replacement filenames and a probability of a match with the second replacement name.

19. The non-transitory, computer-readable medium of claim 16, wherein performing the two-way synchronization of the file between the first computing system and the second computing system further comprises, in response to failing to determine the modified filename for the file, storing, by the first computing system of the cloud-based storage environment, the file with the second replacement name.

20. The non-transitory, computer-readable medium of claim 16, wherein performing the two-way synchronization of the file between the first computing system and the second computing system further comprises, in response to failing to determine the modified filename for the file, providing, by the first computing system of the cloud-based storage environment, an error message.

* * * * *